(12) United States Patent
Lohkamp et al.

(10) Patent No.: US 9,394,897 B2
(45) Date of Patent: Jul. 19, 2016

(54) APPARATUS USING ELECTRONICALLY-CONTROLLED VALVES

(71) Applicant: Fluke Corporation, Everett, WA (US)

(72) Inventors: Tom Lohkamp, Phoenix, AZ (US); Bill Stephens, Chandler, AZ (US); Martin Gotch, Phoenix, AZ (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 14/853,693

(22) Filed: Sep. 14, 2015

(65) Prior Publication Data

US 2016/0003235 A1 Jan. 7, 2016

Related U.S. Application Data

(63) Continuation of application No. 13/065,356, filed on May 13, 2011, now Pat. No. 9,158,308.

(51) Int. Cl.
*G05D 16/20* (2006.01)
*F04B 49/06* (2006.01)
(Continued)

(52) U.S. Cl.
CPC .............. *F04B 49/065* (2013.01); *F04B 39/10* (2013.01); *F04B 49/22* (2013.01); *F04B 53/10* (2013.01); *G05D 16/208* (2013.01); *Y10T 137/7761* (2015.04); *Y10T 137/85986* (2015.04)

(58) Field of Classification Search
CPC ........ F04B 39/10; F04B 49/065; F04B 49/22; F04B 53/10; G05D 16/208; Y10T 137/85986; Y10T 137/7761

USPC ................... 137/486, 487.5, 565.01, 565.11, 137/565.13, 565.14, 565.16, 565.23; 417/44.2, 297, 298, 505
See application file for complete search history.

(56) References Cited

U.S. PATENT DOCUMENTS 2,785,638 A 3/1957 Moller
3,767,326 A 10/1973 Hetz
(Continued)

FOREIGN PATENT DOCUMENTS

CN 87100647 A 8/1987
CN 101443551 A 5/2009
(Continued)

OTHER PUBLICATIONS

Office Action mailed May 6, 2014, issued in Chinese Patent Application No. 201210110036.6, filed Apr. 13, 2012 (27 pages).
(Continued)

*Primary Examiner* — William McCalister
(74) *Attorney, Agent, or Firm* — Seed IP Law Group PLLC

(57) ABSTRACT

The pumps and pressure controllers described herein aim to pump fluid in two directions, such as from a first port to a second port and vice versa. The pressure controllers aim to control pressure in a system or device, such as a test device, accurately and precisely at a variety of different pressure levels. Generally described, the pumps and pressure controllers described herein may include two or more control valves, which may be actuatable in such a manner so that the pump or pressure controller can switch between operating as a vacuum pump and operating as a compressor. In some embodiments, the pressure controllers may be able to adjust a pressure in the device by small increments thereby providing increased control of the pressure in the device over the prior art. Furthermore, the pressure controllers may be able to control the pressure of a system having low pressure levels.

23 Claims, 5 Drawing Sheets

(51) Int. Cl.
*F04B 39/10* (2006.01)
*F04B 49/22* (2006.01)
*F04B 53/10* (2006.01)

(56) References Cited

U.S. PATENT DOCUMENTS

| | | | |
|---|---|---|---|
| 4,780,064 | A | 10/1988 | Olsen |
| 5,456,581 | A | 10/1995 | Jokela et al. |
| 6,261,068 | B1 | 7/2001 | Kramer et al. |
| 9,010,104 | B2 * | 4/2015 | Rampen .................. F04B 49/22 60/459 |
| 9,188,119 | B2 | 11/2015 | Stein et al. |
| 2005/0254980 | A1 | 11/2005 | Hedman |
| 2007/0253832 | A1 | 11/2007 | Kenney |
| 2009/0314055 | A1 | 12/2009 | Delajoud et al. |

FOREIGN PATENT DOCUMENTS

| | | |
|---|---|---|
| CN | 101793247 A | 8/2010 |
| JP | S6155382 A | 3/1986 |
| JP | 2005538299 A | 12/2005 |
| JP | 2009535557 A | 10/2009 |
| WO | 2004/015270 A1 | 2/2004 |
| WO | 2007127389 A2 | 11/2007 |

OTHER PUBLICATIONS

Office Action mailed Nov. 15, 2014, issued in Chinese Patent Application No. 201210110036.6, filed Apr. 13, 2012 (35 pages).

Office Action mailed Nov. 17, 2015, issued in Japanese Application No. 2012-088835, filed Apr. 9, 2012, 11 pages.

* cited by examiner

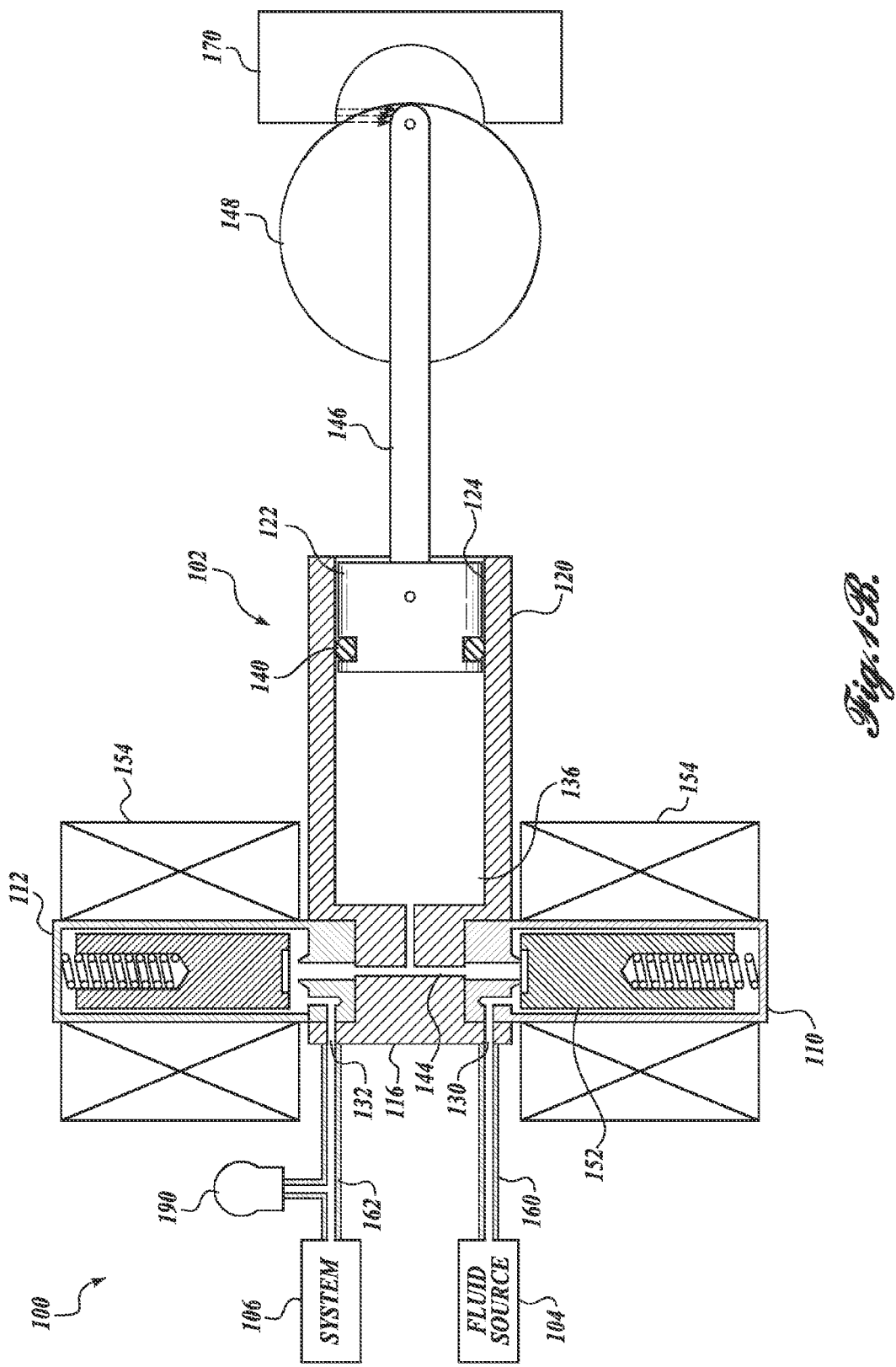

APPARATUS USING ELECTRONICALLY-CONTROLLED VALVES

BACKGROUND

Pumps have been used for centuries for moving fluids, such as liquids, gases, slurries, etc., from a first location to a second location. Pumps can also operate as compressors or as vacuum pumps when the second location is a closed system, such as a pressure vessel. Pumps have wide application. One application for which pumps are employed is a pressure controller, which maintains and controls fluid pressure in a device. Generally described, pressure controllers are capable of maintaining or adjusting system pressure levels of an associated system by controlling the amount of fluid to be added thereto and/or removed therefrom.

Some currently available pressure controllers employ pumps to generate pressure. Such pumps utilize check valves of the ball/spring or poppet/spring type to preventing fluid flow in the reverse direction. Check valves of the ball/spring type include a ball that is held against a valve seat by a force from a spring thereby sealing the valve closed. To open the check valve, a pressure force greater than the spring force must be applied to move the ball away from the seat. In that regard, the pressure differential required to open the valve, sometimes referred to as the crack or cracking pressure, limits the lowest absolute pressure achievable in the device to be controlled. That is, the device to be controlled typically cannot be controlled to an absolute pressure level that is at or below the pressure required to open the valve.

In general, the rate of flow pumped by piston pumps utilizing check valves is controllable by varying the cycle rate of the piston. This limits the range of flow rates that may be generated. Pressure controllers, however, may need large flow rates to change pressure quickly and at other times may need small flow rates to maintain a stable reference pressure. Because of these needs, some pressure controllers use piston-pumps with check-valves to generate the large flow rates and additional control valves to generate small flow rates. The addition of the control valves, however, increases cost, size and weight of the pressure controller.

Furthermore, the device providing precise metering of fluids, e.g. the control valves, is separate from the device generating pressure, e.g. the piston-pump, and thus complicates control of pressure and/or flow rate. For instance, referring to a typical application of a pressure controller, wherein the pressure in a device to be controlled is currently low and is to be increased to a higher pressure and then held there precisely, initially the control valve is opened completely, and the pump is cycled at full speed. When the desired pressure is near, the pump may be slowed, and the control valve partially closed. If the pump is slowed too much, however, the pressure between the control valve and the pump will drop making it difficult to maintain flow through the control valve. If the flow is higher than the desired flow through the control valve, pressure upstream of the control valve will increase to the maximum pressure of the pump. This consumes excessive power and increases the required sensitivity of the control valve.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a pressure controller is provided. The pressure controller comprises a housing that includes a first port, a second port, and a cavity. The cavity has a variable volume that expands and contracts during operation of the pressure controller. The pressure controller further includes a first control valve and a second control valve. The first and second control valves have an open state and a closed state. The first control valve selectively connects the cavity in fluid communication with a fluid source via the first port when the first control valve is in the open position. The second control valve selectively connects the cavity in fluid communication with a system to be controlled via the second port when the second control valve is in the open position. The pressure controller further includes a computing device configured to actuate the first control valve and the second control valve between the open and closed states so as to operate the pressure controller in two modes of operation. The first mode of operation is as a compressor configured to supply fluid from the fluid source to the system, and the second mode of operation is as a vacuum pump configured to remove fluid from the system.

In accordance with another aspect of the present disclosure, a system is provided for controlling pressure of a device. The system includes a housing and a fluid source. The housing has a first port, a second port coupled in fluid communication with the device, and a cavity connected in fluid communication with the first port and the second port. The fluid source is coupled to the first port. The system further includes a system control valve and a source control valve. The system control valve and the source control valve are selectively actuatable to an open position or to a closed position. Fluid is permitted to flow between the cavity and the second port when the system control valve is in the open position, and fluid is permitted to flow between the cavity and the first port when the source control valve is in the open position. The system further includes a piston, a detector, and a controller. The piston is movable in a cylinder for forming the cavity. The cavity has an increasing volume as the piston moves in a first direction and a decreasing volume as the piston moves in a second, opposite direction. The detector is configured to output one or more signals indicative of the piston position as it moves within the cylinder. The controller is configured to actuate at least one of the system control valve or the source control valve to the open position or the closed position based at least in part on the one or more signals.

In accordance with yet another aspect of the present disclosure, a pump is provided. The pump includes a first port, a second port, a bore, and a piston. The piston is movable within the bore so as to form a cavity having a variable volume. The piston is actuatable within the bore to expand and contract the volume of the cavity. The pump further includes a first control valve, a second control valve, and a controller. The first control valve is configured to selectively couple the cavity in fluid communication with the first port when the first control valve is in the open position. The second control valve is configured to selectively couple the cavity in fluid communication with the second port when the second control valve is in the open position. The controller is configured to actuate the first and second control valves to the open position or to a closed position as the piston moves within the bore so as to cause fluid to flow in a first direction from the first port to the second port and a second, opposite direction from the second port to the first port.

DESCRIPTION OF THE DRAWINGS

The foregoing aspects and many of the attendant advantages of this disclosure will become more readily appreciated by reference to the following detailed description, when taken in conjunction with the accompanying drawings, wherein:

FIG. 1B is a schematic illustration of the pressure controller of FIG. 1A illustrating the piston in a second position;

DETAILED DESCRIPTION

Figure 1A:
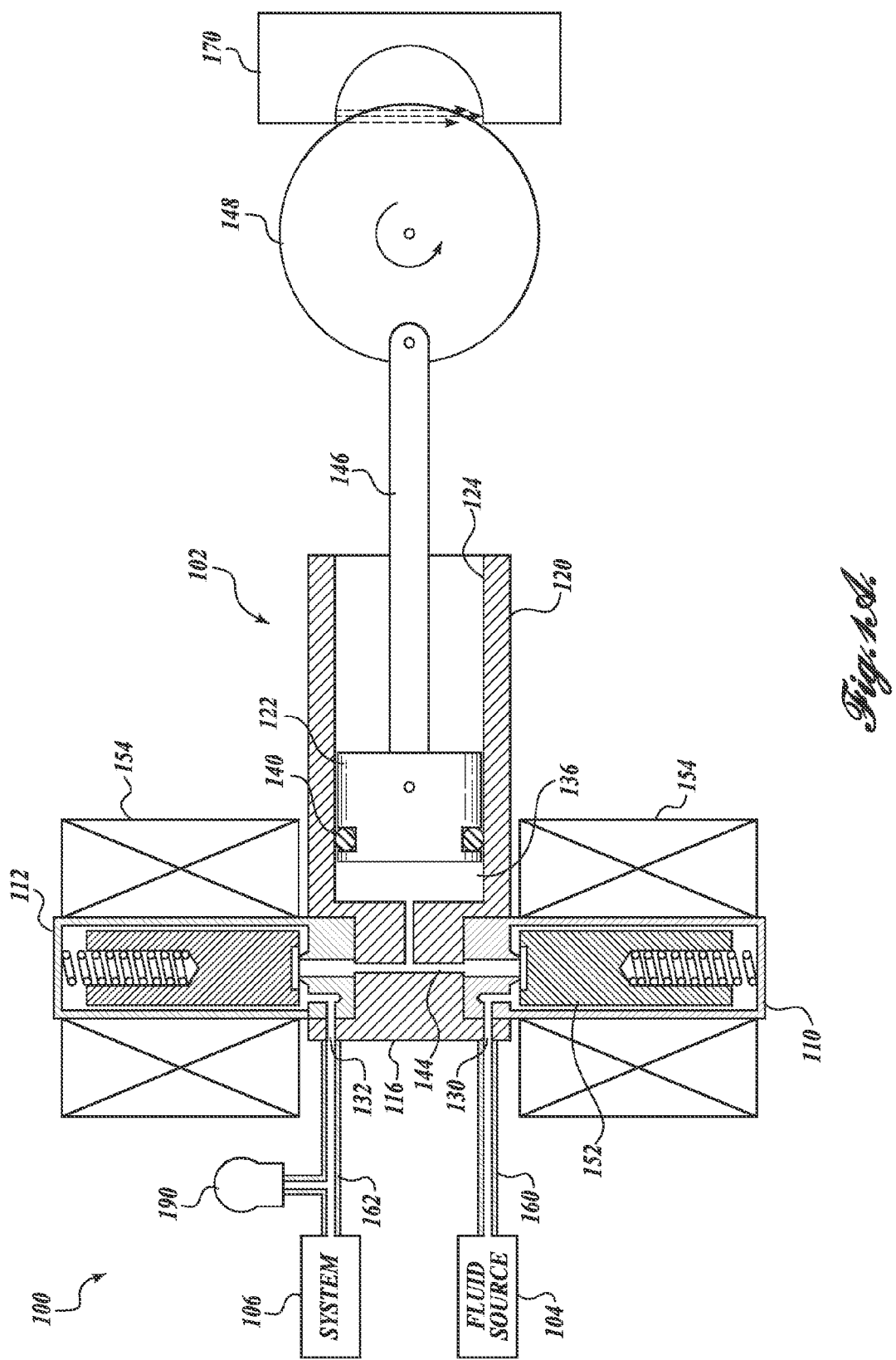
FIG. 1A is a schematic illustration of one example of a pressure controller in accordance with aspects of the present disclosure, wherein the piston is in a first position.

While illustrative embodiments are described below, it will be appreciated that various changes can be made therein without departing from the spirit and scope of the claimed subject matter. In that regard, the detailed description set forth below, in connection with the appended drawings where like numerals reference like elements, is intended only as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion provides examples of pumps or pumping systems, and systems for controlling pressure, such as pressure controllers, that may employ such pumps or pumping systems. Generally described, examples of the pressure controllers described herein aim to control pressure in an associated system or device, such as a test device, accurately and precisely at a variety of different pressure levels. In that regard, several examples of the pressure controllers described herein are configured to adjust a pressure in the associated device by small increments thereby providing increased pressure control as compared to prior art devices. Furthermore, examples of the pressure controllers described herein may be able to control the pressure of an associated system having low pressure levels, such as less than 150 pounds per square inch (psi). Additionally, examples of the pressure controllers described herein may be able to control a wide range of flow rates and the direction of the flow.

As will be described in more detail below, examples of the pressure controllers and/or pumps described herein may include two electronically-controlled valves for regulating fluid pressure, the direction of fluid flow, and/or the like. In that regard, in some embodiments, the electronically-controlled valves may be controlled in such a manner as to provide the pressure controller and/or pumps with two switchable modes of operation: the first mode of operation being a vacuum pump and the second mode of operation being a compressor. In some embodiments, by using electronically-controlled valves, fewer valves may be used to control the pressure in the associated device to be controlled.

It will be appreciated that the electronically controlled valves can be "controlled" according to various logic for carrying out the intended function(s) of the pressure controller and/or pump. Examples of logic described herein may be implemented in a variety of configurations, including but not limited to hardware (e.g., analog circuitry, digital circuitry, processing units, etc., and combinations thereof), software, and combinations thereof. In circumstances were the components are distributed, the components are accessible to each other via communication links.

Although shown and described for controlling pressure in a system or device, it should be appreciated that the examples of the pressure controllers and pumps described herein may be applied to other systems where pressure control is desired, such as for example, vacuum systems and fluid flow control systems. Furthermore, it should be appreciated that the fluid described herein may include, but is not limited to, a liquid and a gas.

Turning now to FIGS. 1A and 1B, there is shown one embodiment of a pressure controller 100 formed in accordance with aspects of the present disclosure. As best shown in FIGS. 1A and 1B, the pressure controller 100 includes a pump 102 selectively connected to a fluid source 104 and a system 106 to be controlled via first and second electronic control valves 110 and 112, respectively. As indicated above, several embodiments of the pressure controller 100 may function in two modes of operation: (1) the first mode being a compressor configured to add fluid to the system 106 from the fluid source 104, thereby increasing the pressure in the system 106; and (2) the second mode being a vacuum pump configured to remove fluid from the system 106 to the fluid source 104, thereby decreasing the pressure in the system 106.

The fluid source 104 can be a tank of liquid, atmospheric air, a supply of gas under pressure, etc. In that regard, it should be appreciated that in some embodiments the fluid source 104 may be a pressurized fluid source or a source of fluid at atmospheric pressure. In other embodiments, the fluid source 104 may be at vacuum pressure. Similarly, embodiments of the system 106 may contain a fluid under pressure, at vacuum pressure, or atmospheric pressure, depending on the intended application.

As best shown in FIGS. 1A and 1B, the pump 102 is of the positive displacement type, and includes a housing or pump head 116 having a cylinder 120, a piston 122 that is reciprocatingly driven in the bore 124 of the cylinder 120 via an actuator 128, and first and second ports 130 and 132 that are configured to be connected to the fluid source 104 and the system 106, respectively. The reciprocating piston 122, in conjunction with the cylinder bore 124, defines a chamber or cavity 136 with a variable volume disposed on one side of the piston 122. Operatively connected to the other side of the piston 122 is the actuator 128 for imparting reciprocating movement to the piston 122. In the embodiment shown, the cavity 136 is sealed from atmosphere by piston seal 140, and is selectively connected in fluid communication with the first and second ports 130 and 132 via fluid circuit 144 and first and second control valves 110 and 112, respectively.

In the embodiment shown in FIGS. 1A and 1B, the actuator 128 comprises a rotary-to-reciprocating mechanism in the form of a connecting rod 146 and crank 148. The connecting rod 146 is coupled to the crank 148 at a first end and is coupled to the piston 122 at a second end. A motor 180 (FIG. 3) rotates the crank 148 in a counter-clockwise direction as is illustrated in FIGS. 1A and 1B or, alternatively, in a clockwise direction. As the crank 148 is rotated by the motor, the connecting rod 146 causes the piston 122 to move linearly within the cylinder bore 124 in a reciprocating manner. In that regard, as the piston 122 moves away from the fluid circuit 144 of the housing 116, the volume of the cavity 136 increases, thereby decreasing the pressure therein as is best illustrated by FIG. 1B. Conversely, as the piston 142 moves towards the fluid circuit 144 of the housing 116, the volume of the cavity 136 decreases thereby increasing the pressure in the cavity 136, as is best illustrated by FIG. 1A.

It will be appreciated that while a connecting rod/crank configuration has been illustrated as one example of a rotary-to-reciprocating mechanism, other rotary-to-reciprocating mechanisms can be employed in embodiments of the present disclosure, including cams, Scottish yokes, and the like. Alternatively, embodiments of the present disclosure may employ linear actuators, such a hydraulic or pneumatic cylinders, linear motors, and the like, for driving the piston in a reciprocating manner. While the illustrated embodiment of FIGS. 1A and 1B depict a driven piston 122, other embodiments can employ a driven housing 116 with a stationary piston to achieve the same or similar affect.

As briefly described above, the pump 102 includes a first control valve 110 and a second control valve 112. In the embodiment shown in FIGS. 1A and 1B, the first control valve 110 is connected in fluid communication with the fluid source 104 via the first port 130 and a fluid conduit 160, and as such, may be referred to as a source control valve 110. Similarly, the second control valve 112 is connected in fluid communication with the system 106 via the second port 132 and a fluid conduit 162, and as such, may be referred to as a system control valve 112. As shown best in FIGS. 1A and 1B, the source control valve 110 is configured to place the first port 130 in selective communication with the cavity 136, and the system control valve 112 is configured to place the second port 132 in selective communication with the cavity 136. That is, when the source control valve 110 is in an open position, the fluid circuit 144 of the housing 116 is in fluid communication with the fluid source 104, and when the source control valve 110 is in a closed position, the fluid circuit 144 of the housing 116 is not in fluid communication with the fluid source 104. Similarly, when the system control valve 112 is in an open position, as is best illustrated by FIG. 1B, the fluid circuit 144 of the housing 116 is in fluid communication with the system 106, and when the system control valve 112 is in a closed position, the fluid circuit 144 of the housing 116 is not in fluid communication with the system 106.

It should be appreciated that when the system control valve 112 is in the open position and the pressure in the cavity 136 is greater than the pressure in the system 106, fluid will flow from the cavity 136 to the system 106. If the system 106 is a closed system, then the pump is operating as a compressor. Conversely, when the pressure in the cavity 136 is less than the pressure in the system 106, fluid flows from the system 106 to the cavity 136. In that regard, the pump 102 may be operating as a vacuum pump.

The rate of fluid flow from the cavity 136 to the system 106 may be controlled based on the timing and/or duration of the opening of the source control valve 110 and/or the system control valve 112 relative to the position of the piston 122 in the cylinder 120. For instance, if the pressure controller 100 is operating as a compressor, to obtain maximum flow rates, the source control valve 110 may be opened when the piston 122 reaches the end of the compression stroke and the system control valve 112 may be opened when the piston 122 reaches the end of the expansion stroke. Conversely, to obtain small flow rates, the source control valve 110 may be opened late in the expansion stroke, and the system control valve 112 may be opened late in the compression strong thereby controlling the amount of pressure in the cavity 136. Therefore, the pressure controller 100 is able to control the flow rate to the system 106 from a maximum flow rate to a small flow rate. Additionally, the pressure controller 100 may stop flow to the system 106 by not opening the system control valve 112. Furthermore, the source control valve 110 and the system control valve 112 may be actuatable for variable durations and multiple times per pump 122 stroke to control the flow rate through the source control valve 110 or the system control valve 112.

It should also be appreciated that the source control valve 110 and the system control valve 112 may be any valve actuatable upon receipt of suitable signals. Suitable valves include but are not limited to solenoid valves, pneumatically, hydraulically, or other motor actuated control valves, piezoelectric control valves, or the like. In the illustrated embodiment, the source control valve 110 and the system control valve 112 are solenoid valves that comprise a movable valve stem 152 and a coil 154. It is to be appreciated that the control valves 110 and 112 may have a steady state in the open position and may be actuated to a closed position in response to receipt of appropriate control signals or, alternatively, have a steady state in the closed position and may be actuated to an open position in response to receipt of appropriate control signals. In the embodiment shown in FIGS. 1A and 1B, the valves 110 and 112 have a steady state in the closed position, and have a biased state in the open position. It will be appreciated that control valves, such as solenoid, piezoelectric, and the like do not have crack pressures per se, and as such, are able to control pressures at low pressure levels, such as less than 300 psi, and/or make small adjustments to the pressure in the system 106 to be controlled.

Figure 3:
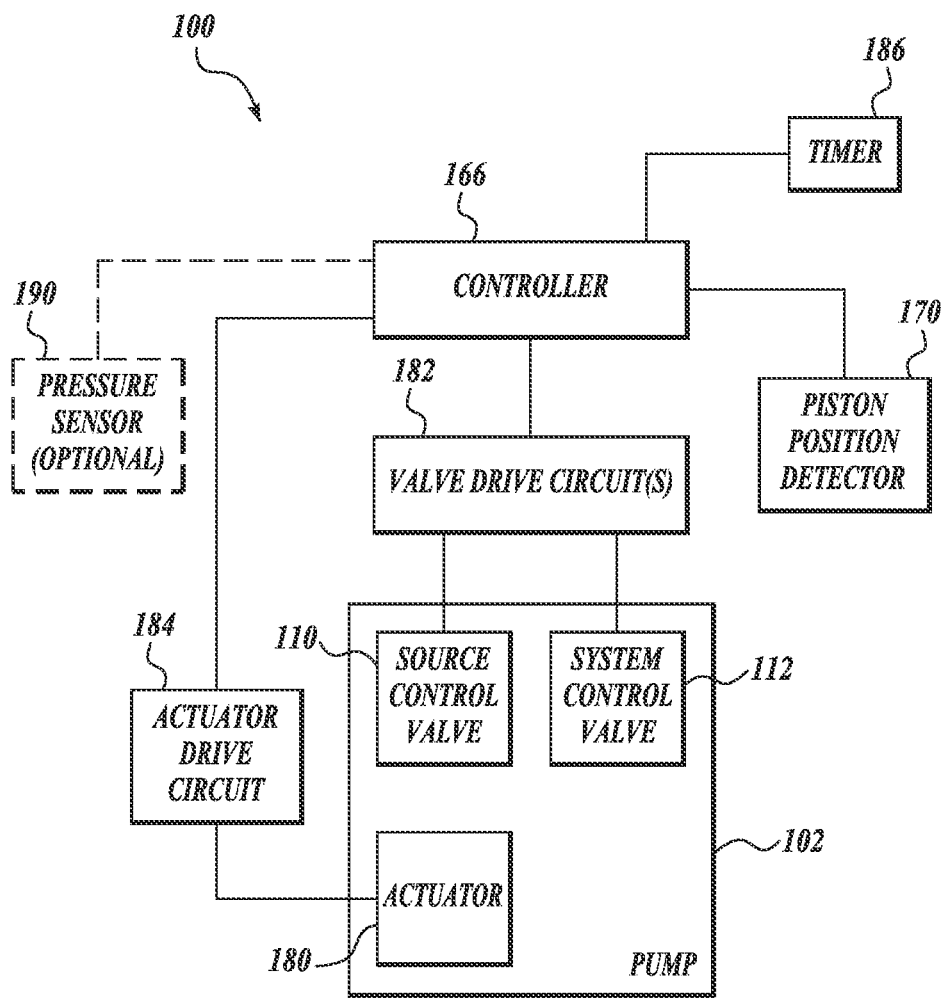
FIG. 3 is a block diagram of the pressure controller of FIG. 1A.

Referring now to the block diagram of FIG. 3, a computing device in the form of a controller 166, such as a microprocessor, digital circuitry, or the like, is provided for controlling the operation (i.e., opening or closing) of the control valves 110 and 112 based on movement of the piston 122. As best shown in FIG. 3, the controller 166 is connected in electrical communication with a piston position detector 170 and the first and second control valves 110 and 112 via one or more drive circuits 182. Generally described, the controller 166 receives signals from the piston position detector 170 indicative of the position (e.g., relative or absolute) of the piston 122 as the piston 122 reciprocates within the cylinder bore 120. In one embodiment, the piston position detector 170 may include two proximity sensors that generate signals at or near the beginning and ending of the piston's stroke. In other embodiments, the piston position detector 170 may include other sensors or devices, such as linear or rotary encoders, hall effect transducers, capacitive or inductive transducers, potentiometers, etc., for determining the position of the piston. It will be appreciated that the position of the piston can be also determined by measuring the position of other components associated with the piston, such as the connecting rod, crank, or the like. As will be explained in more detail below, other embodiments may employ an optical sensor as the piston position detector 170.

The controller 166 processes the signals received from the piston position detector 170 according to various logic rules, and outputs control signals to the one or more drive circuits 182. The one or more drive circuits 182, in response to receiving control signals from the controller 166, process the received control signals, and output suitable device level signals (e.g., voltage, current, etc.) to the first and second control valves 110 and 112. Upon receipt of the device level signals, the control valves 110 and 112 changes states, such as from an open to a closed state or from a closed to an open state. In one embodiment, the controller 166 may also control the motor 180 of the actuator 128 via an actuator drive circuit 184.

An operation of one embodiment of the pump 102 will now be described with reference to FIGS. 1A and 1B. To pump fluid from the fluid source 104 to the system 106, the controller 166 operates the control valves 110 and 112 in the following manner. As the piston 122 reaches the end of its compression stroke (piston moving from right to left in FIGS. 1A and 1B), the controller 180 opens the source control valve 110 and closes the system control valve 112. The control valves 110 and 112 remain in such states as the piston 122 moves from the piston position shown in FIG. 1A to the piston position shown in FIG. 1B. Because the volume of the cavity 136 is expanding, the pressure therein decreases. If the fluid in fluid source 104 is at a higher pressure, the fluid from the fluid source is drawn into the cavity 136. Once the piston 122 reaches the end of its expansion stroke (piston moving from left to right in FIGS. 1A and 1B), the controller 166 closes the source control valve 110 and opens the system control valve 112. The control valves 110 and 112 remain in such states as the piston 122 moves from the piston position shown in FIG. 1B to the piston position shown in FIG. 1A. Because the volume of the cavity 136 is decreasing, the pressure therein increases. If the pressure in the cavity 136 is greater than the pressure in the system 106, the fluid occupying the cavity 136 is forced into the system 106. If the system 106 is closed, the pump 102 will be acting as a compressor.

It will be appreciated that to operate the pump 102 as a vacuum pump (e.g., removing fluid from the system 106), the control valves 110 and 112 are operated in the opposite manner as just described. In that regard, an operation of the pump 102 acting as a vacuum pump will now be described. As the piston 122 reaches the end of its compression stroke (piston moving from right to left in FIGS. 1A and 1B), the controller 180 opens the system control valve 112 and closes the source control valve 110. The control valves 110 and 112 remain in such states as the piston 122 moves from the piston position shown in FIG. 1A to the piston position shown in FIG. 1B. Because the volume of the cavity 136 is expanding, the pressure therein decreases. If the fluid in the system 106 is at a higher pressure, the fluid from the system 106 is drawn into the cavity 136. Once the piston 122 reaches the end of its expansion stroke (piston moving from left to right in FIGS. 1A and 1B), the controller 166 closes the system control valve 112 and opens the source control valve 110. The control valves 110 and 112 remain in such states as the piston 122 moves from the piston position shown in FIG. 1B to the piston position shown in FIG. 1A. Because the volume of the cavity 136 is decreasing, the pressure therein increases. If the pressure in the cavity 136 is greater than the pressure in the fluid source 104, the fluid occupying the cavity 136 is forced into the fluid source 104. If the system 106 is closed, the pump 102 will be acting as a vacuum pump.

Figure 2A:
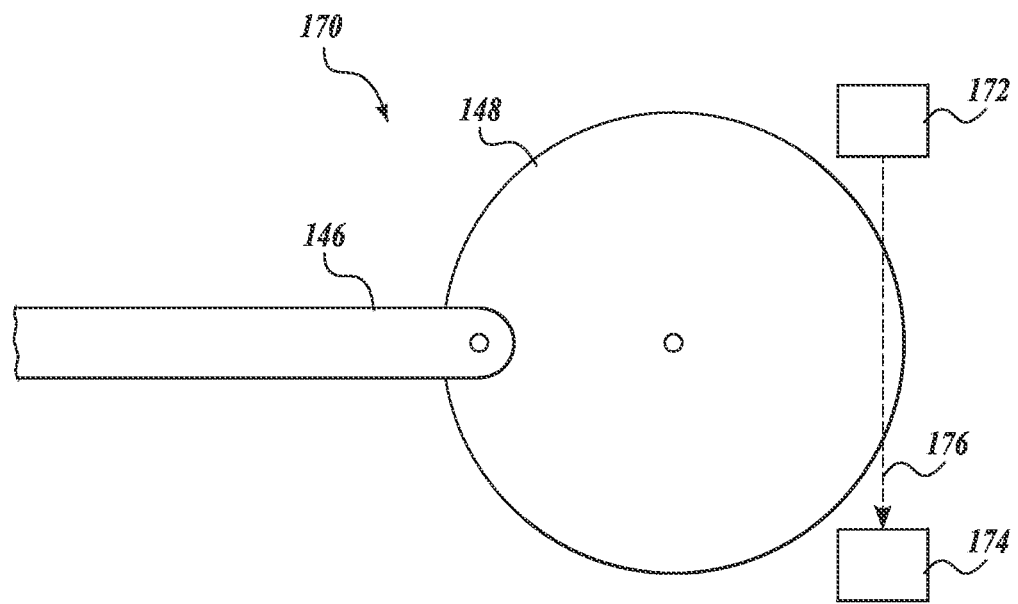
FIG. 2A is a schematic view of one example of a piston position detector in a first position in accordance with aspects of the present disclosure.
Figure 2B:
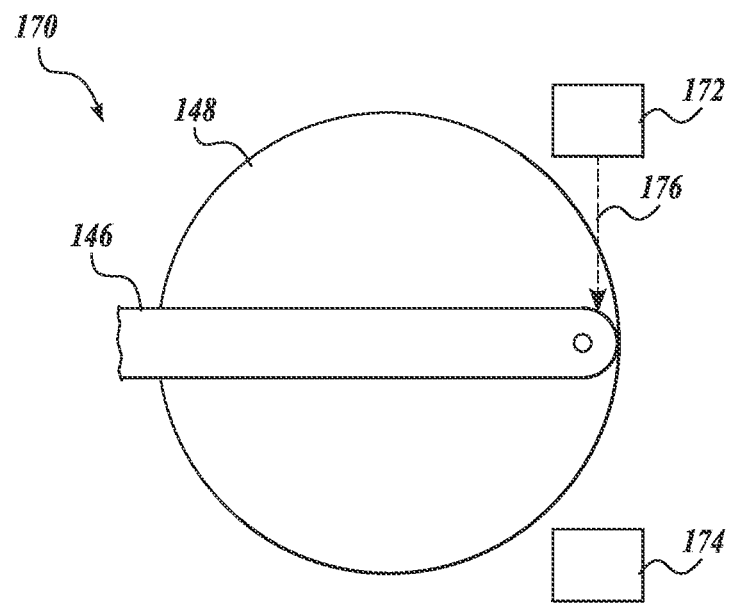
FIG. 2B is a schematic view of the piston position detector of FIG. 2A in a second position.

Turning now to FIGS. 2A and 2B, another embodiment of the piston position detector 170 will be described. As best shown in FIGS. 2A and 2B, the piston position detector 170 includes a light source 172, such as a light emitting diode (LED), mounted a spaced distance from a photosensor 174 such that the light source 172 is aligned with the photosensor 174. The photosensor 174 may be configured to sense a beam of light 176 that emits from the light source 172 as is best illustrated in FIG. 2A. In some embodiments, the photosensor 174 may be coupled to a signal generator.

In the embodiment shown, the light source 172 may be positioned such that each time the crank 148 completes a full rotation, a portion of the connecting rod 146 obstructs the beam of light 176 emitted from the light source 172 as is best illustrated in FIG. 2B. As the portion of the connecting rod 146 obstructs the beam of light 176, the amount of light sensed by the photosensor 174 is reduced. In response to this reduction in sensed light intensity, the photosensor 174 may be configured to generate a signal for output to the controller 166. In an alternative embodiment, the photosensor 174 may be coupled to a signal generator configured to generate a signal in response to the reduction in sensed light intensity for output to the controller 166. It should be appreciated that the position of the piston 122 when the portion of the connecting rod 146 obstructs the beam of light 176 is known based on the known structure of the pump 102. Therefore, the generated signal communicates the position of the piston 122 at the time in which the signal is generated.

In the illustrated embodiment, the connecting rod 146 obstructs the beam of light 176 emitted from the light source 172 once during each rotation of the crank 148. It should be appreciated that any feature on the crank 148 or the connecting rod 146 may be configured to obstruct the beam of light 176 emitted from the light source 172 and that the obstruction may occur any number of times during a cycle.

In addition to determining the position of the piston 122 from the output of the piston position detector 170, other operating parameters, such as piston speed, direction, etc., can be obtained. Returning to FIG. 3, in some embodiments, the controller 166 may include or be coupled to a timer 186. In response to receiving the generated signal from the piston position detector 170, now referred to as a first signal, the controller 166 may be configured to start the timer 186. As the crank 148 completes a subsequent rotation, the portion of the connecting rod 146 again obstructs the beam of light 176 of the piston position detector 170 thereby causing the piston position detector 170 to generate a second signal for output to the controller 166. In response to receiving the second signal, the controller 166 may be configured to stop the timer 186.

Using suitable programmable logic or algorithms, the controller 166 is capable of determining a rotational speed of the crank 148 or a cycle speed of the piston 122 based on the first signal and second signal. The controller 166 may be configured to use the determined speed of the piston 122 and the known position of the piston 122 when a signal is generated by the piston position detector 170 to predict a location and direction of the piston 122 within the cylinder 120 at any given time during a subsequent rotation of the crank 148. With this data, the controller 166 may be further configured to determine the timing of control signals for causing the driver circuit 182 to actuate the source control valve 110 and/or the system control valve 112 in the desired sequence, duration, etc.

For example, in one embodiment, depending on the position and direction of travel of the piston 122, the controller 166 alternatingly actuates the source control valve 110 and the system control valve 112 from the open position to the closed position in order to maintain the maximum flow rate through the cavity 136. In another embodiment, depending on the position and direction of travel of the piston 122, the controller 166 alternatingly actuates the source control valve 110 and the system control valve 112 from the open position to the closed position in order to maintain and adjust the pressure in the system 106.

It should be appreciated that the duration of which the source control valve 110 and/or the system control valve 112 remains open may depend on the amount of pressure the controller 166 determines appropriate for maintaining or making adjustments to the pressure of the system 106. Small incremental pressure changes may be achieved by opening one or both of the source control valve 110 and the system control valve 112 for only a portion of the expansion and/or compression stroke of the piston 122. It should be appreciated that the source control valve 110 and/or the system control valve 112 may be actuated multiple times with variable durations during a single cycle of the piston 144 in order to regulate (e.g., maintain or adjust) the pressure in the system 106. In some embodiments, it may be that the control valves 110 and 112 are open or closed at the same time along a portion of the expansion and/or compression stroke.

In some embodiments, the pressure controller 100 further includes a pressure sensor 190 that is capable of measuring the fluid pressure of the system 106, as is illustrated in FIGS. 1A and 1B. The pressure sensor 190 may be coupled to the controller 166 for providing a pressure feedback signal thereto. In operation, the controller 166 compares the feedback signal to a desired pressure for the system 106 to identify a difference in pressure. The controller 166 then utilizes the difference in pressure to adjust the control of the control valves 110 and 112.

Figure 4:
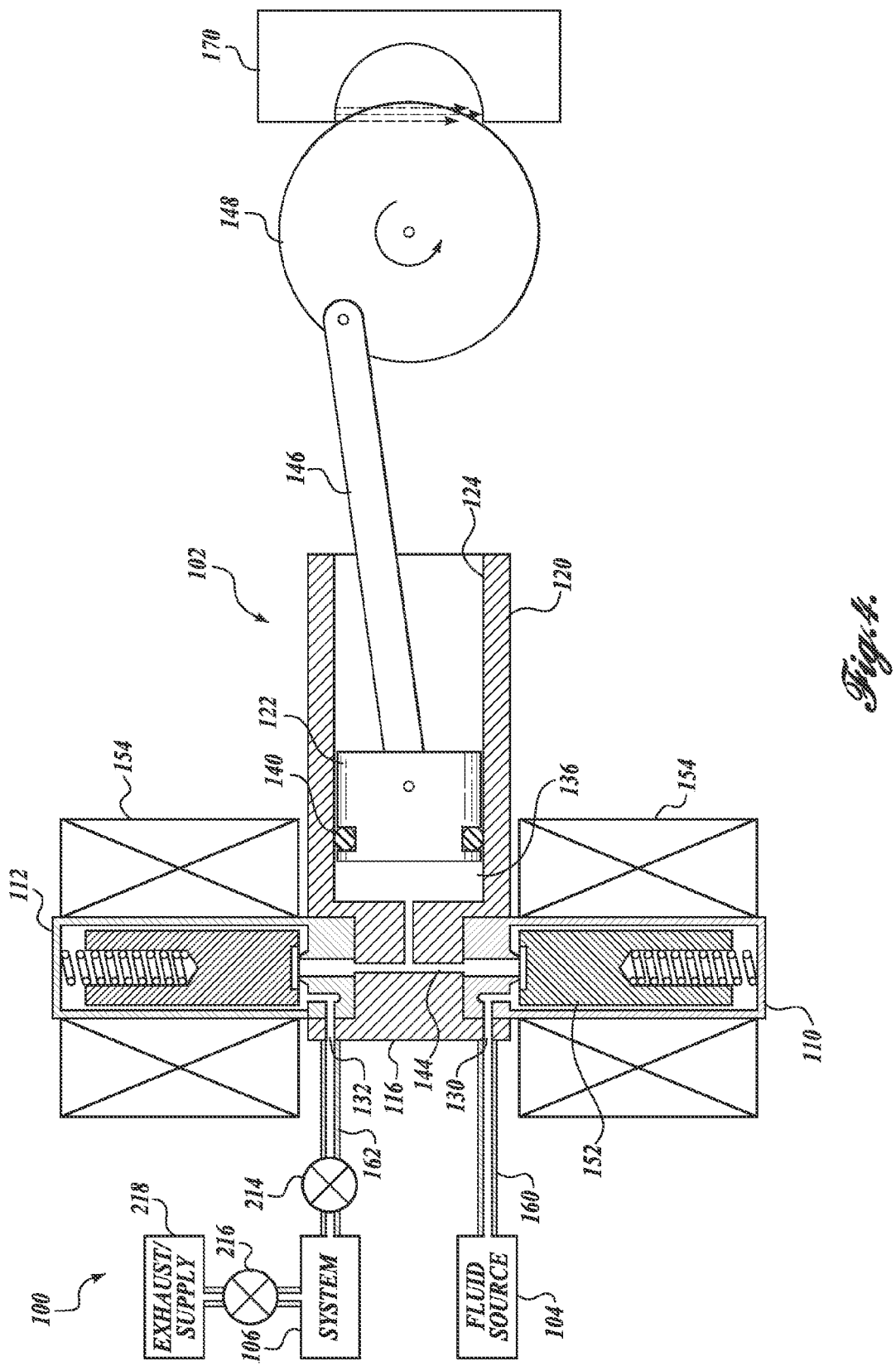
FIG. 4 is another example of a pressure controller formed in accordance with aspects of the present disclosure.

FIG. 4 is another embodiment of a pressure controller 200 formed in accordance with aspects of the present disclosure. The pressure controller 200 is similar in construction and operation as the pressure controller 100 except for the differences that will now be described. As best shown in FIG. 4, the pressure controller may include one or more additional control valves, such as control valve 214 that connects the port 132 in selective fluid communication with the system 106. The control valve 214 can be any control valve, including those described herein, that can be controlled by the controller 166. In operation, the control valve 214 meters the flow of fluid into or out of the system 106. Benefits of such an arrangement include, for example, the separation of the function of pressure control from that of pumping, while being capable of making small incremental pressure adjustments. In addition to or instead of control valve 214, a control valve 216 can be employed for connecting the system 106 to a fluid exhaust/supply 218 distinct from the pump 102.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A pressure controller comprising:
    a housing including a first port, a second port, and a cavity, the cavity having a piston that varies a volume of the cavity by undergoing a compression stroke and an expansion stroke during operation of the pressure controller;
    a first control valve having an open state and a closed state, the first control valve selectively connecting the cavity in fluid communication with a fluid source via the first port when the first control valve is in the open position;
    a second control valve having an open state and a closed state, the second control valve selectively connecting the cavity in fluid communication with a system to be controlled via the second port when the second control valve is in the open position; and
    a computing device configured to actuate the first control valve and the second control valve between the open and closed states so as to operate the pressure controller in two modes of operation, the first mode of operation being as a compressor configured to supply fluid from the fluid source to the system, and the second mode of operation being as a vacuum pump configured to remove fluid from the system, wherein the computing device is further configured to send control signals to the first and second control valves to independently open and close the first and second control valves for one or more time durations that are less than a time duration equal to complete the expansion or compression stroke of the piston.

2. The pressure controller of claim 1, wherein the computing device is configured to actuate the first control valve and the second control valve for varying durations to provide different flow rates through the second control valve.

3. The pressure controller of claim 2, further comprising a pressure sensor configured to measure the fluid pressure of the system to be controlled, the pressure sensor being coupled to the computing device for providing a feedback signal indicative of the pressure in the system to the computing device.

4. The pressure controller of claim 3, wherein the computing device uses the feedback signal to determine when to actuate one of the first control valve and/or the second control valve.

5. The pressure controller of claim 1, further comprising:
    a cylinder defining a bore, wherein:
        the piston is located in the bore of the cylinder;
        the piston is moveable within the bore so as to change a pressure within the cavity;
        a piston position detector is configured to detect a position of the piston; and
        the computing device is configured to control at least one of the first control valve and the second control valve based at least in part on the position of the piston.

6. The pressure controller of claim 5, wherein the piston moves in the bore between a first position and a second position in a reciprocating manner, and wherein the piston position detector detects the position of the piston once per cycle of the piston reciprocating within the cylinder.

7. The pressure controller of claim 5, wherein the piston position detector comprises a light source aligned with a photosensor, and wherein the light source is configured to emit light towards the photosensor and the photosensor is configured to sense the light emitted by the light source.

8. The pressure controller of claim 5, wherein the computing device is configured to calculate the speed and current position of the piston from one or more piston positions detected by the piston position detector.

9. The pressure controller of claim 8, wherein the computing device is configured to control one or more of the first control valve and the second control valve based at least in part on the speed and current position of the piston.

10. The pressure controller of claim 1, wherein the first control valve and the second control valve are solenoid valves.

11. A system for controlling pressure of a device, the system comprising:
    a housing having a first port, a second port coupled in fluid communication with the device, and a cavity connected in fluid communication with the first port and the second port;
    a fluid source coupled to the first port;

a system control valve that is selectively actuatable to an open position or to a closed position, wherein fluid is permitted to flow between the cavity and the second port when the system control valve is in the open position;

a source control valve that is selectively actuatable to an open position or to a closed position, wherein fluid is permitted to flow between the cavity and the first port when the source control valve is in the open position;

a piston movable in a cylinder for forming the cavity, the cavity having an increasing volume as the piston moves in a first direction in an expansion stroke and a decreasing volume as the piston moves in a second, opposite direction in a compression stroke;

a piston position detector configured to output one or more signals indicative of a position of the piston as the piston moves within the cylinder; and a controller configured to independently actuate the system control valve and the source control valve between the open positions and the closed positions to operate the system in first and second modes of operation, the first mode of operation being as a compressor configured to supply fluid from the fluid source to the device, and the second mode of operation being as a vacuum pump configured to remove fluid from the device, the controller being further configured to actuate the system control valve and the source control valve between the open positions and the closed positions for time durations that are less than a time duration equal to complete the expansion or compression stroke of the piston.

12. The system of claim 11, wherein the piston is moveable in the cylinder between a first position and a second position, and wherein at least one of the system control valve or the source control valve is in the open position for a duration less than an amount of time it takes for the piston to move from the first position to the second position or vice versa.

13. The system of claim 11, further comprising an actuator configured to move the piston between a first position and a second position, the cavity increasing in volume as the piston moves from the first position to the second position and decreasing in volume as the piston moves from the second position to the first position.

14. The system of claim 13, wherein the piston position detector includes a light source aligned with a photosensor, and wherein the one or more signals are generated by the piston position detector in response to a portion of the actuator obstructing a beam of light emitting from the light source.

15. The system of claim 14, wherein the piston position detector is configured to detect the position of the piston each time the piston completes one cycle comprising movement from the first position to the second position and back to the first position.

16. The system of claim 11, wherein the piston position detector is configured to detect a plurality of positions of the piston and generate a plurality of corresponding signals in response to the detected plurality of positions.

17. The system of claim 16, wherein the controller is configured to determine a speed of the piston based on the plurality of corresponding signals.

18. The system of claim 11, wherein the system control valve is a first system control valve, the system further comprising a second system control valve configured to selectively couple the second port to the device.

19. The system of claim 11, wherein the system control valve and the source control valve are solenoid valves.

20. A pump comprising:
a first port and a second port;
a bore;
a piston movable within the bore so as to form a cavity having a variable volume, wherein the piston is moveable within the bore to expand the volume of the cavity in an expansion stroke and to contract the volume of the cavity in a compression stroke;
a first control valve configured to selectively couple the cavity in fluid communication with the first port when the first control valve is in an open position;
a second control valve configured to selectively couple the cavity in fluid communication with the second port when the second control valve is in an open position; and
a controller configured to actuate the first and second control valves to the open position or to a closed position as the piston moves within the bore so as to cause fluid to flow in a first direction from the first port to the second port and a second, opposite direction from the second port to the first port, wherein the controller is further configured to send control signals to the first and second control valves to independently open and close the first and second control valves for time durations that are less than a time duration equal to complete the expansion stroke or the compression stroke.

21. The pump of claim 20, further comprising one or more sensors configured to detect at least a position of the piston and a speed of the piston for output to the controller, wherein the controller is configured to actuate one or both of the first control valve and the second control valve based at least in part on the output of the one or more sensors.

22. The pump of claim 20, wherein the controller is configured to control the duration in which the first control valve and the second control valve are in the open position to control the rate of fluid flow.

23. The pump of claim 20, wherein the controller is configured to control the timing in which the first control valve and the second control valve are in the open position based on a position of the piston in the bore to control the rate of fluid flow.

* * * * *